May 1, 1956   H. R. WATSON ET AL   2,743,618
OPERATING THE FLAPS OF AIRCRAFT WINGS
Filed Jan. 11, 1954                                   2 Sheets-Sheet 1
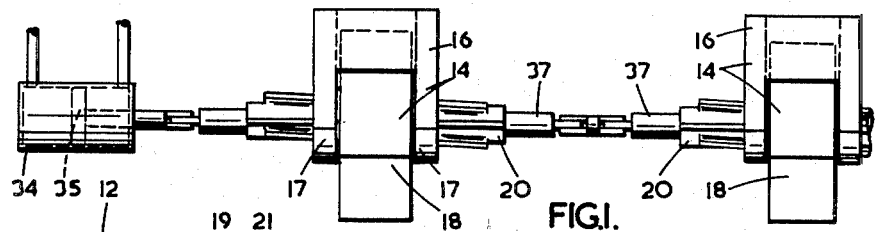
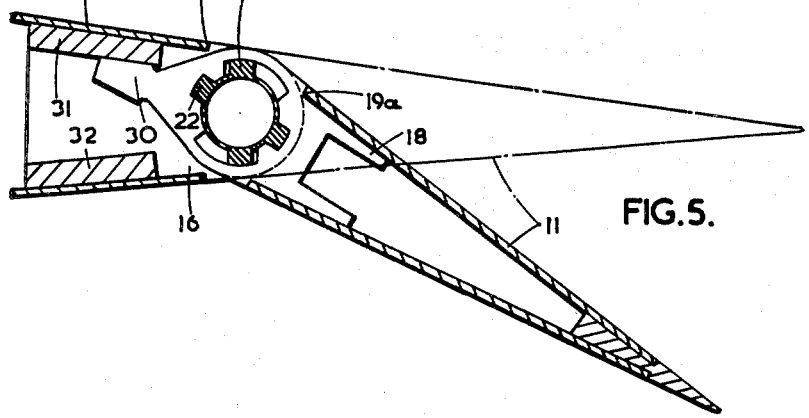
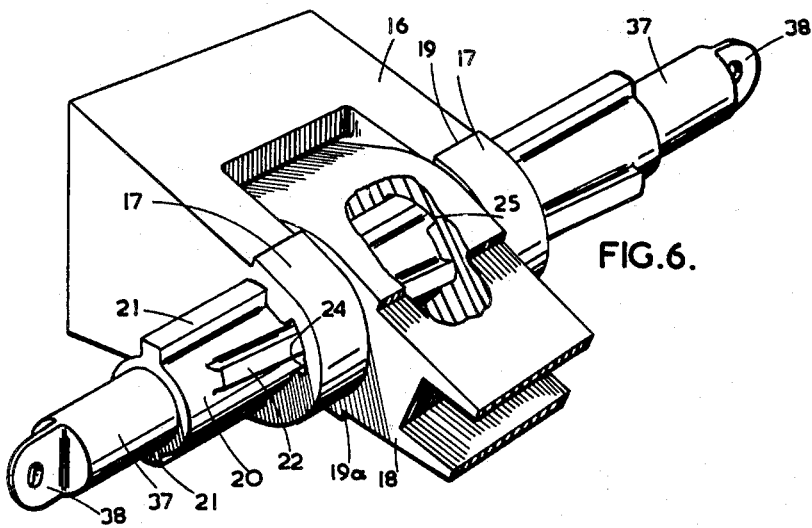
INVENTORS
H. R. WATSON &
F. R. ELLIOTT

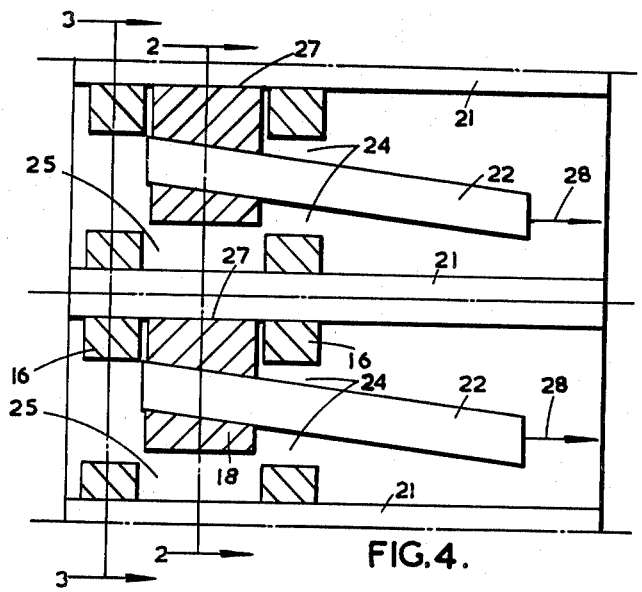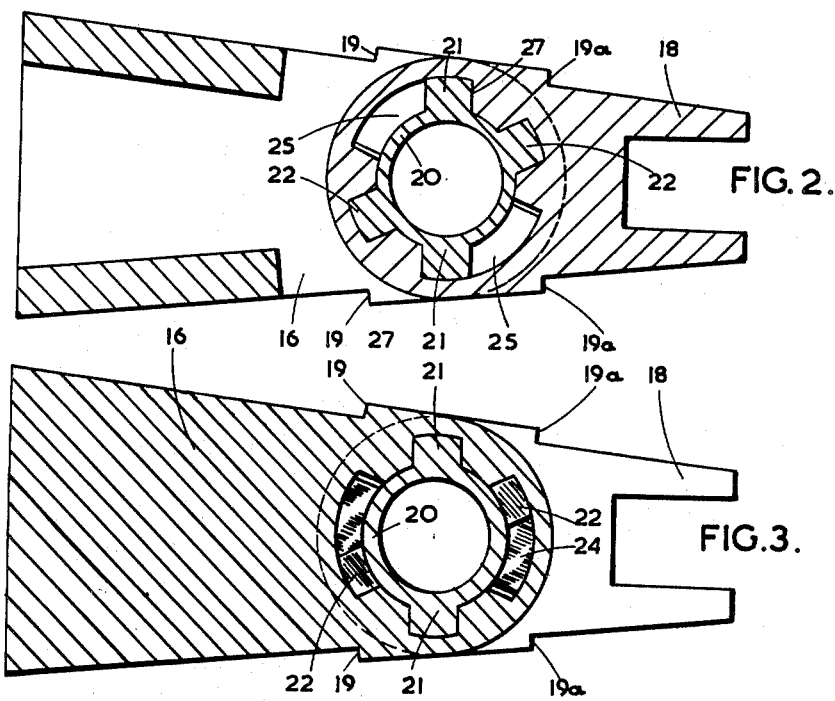

United States Patent Office 2,743,618
Patented May 1, 1956

2,743,618

OPERATING THE FLAPS OF AIRCRAFT WINGS

Henry Romaine Watson and Frederick Ralph Elliott, Coventry, England, assignors to Sir W. G. Armstrong Whitworth Aircraft Limited, Coventry, England Application January 11, 1954, Serial No. 403,148

Claims priority, application Great Britain March 20, 1953

4 Claims. (Cl. 74—99)

This invention relates to an aircraft wing and particularly one having a low thickness/chord ratio such as is necessary if the aircraft is to fly at supersonic speeds, particularly at a Mach number of, say, two or higher.

In that case it is usually found necessary to provide the wing with a nose flap which can be lowered at low speeds—and, of course, there are usually ailerons or other flaps on the trailing edges.

The main object of the present invention is to arrange for the hinging of such a "thin" flap to be entirely internal—i. e., without any external excrescence.

A further object is to provide a satisfactory actuating mechanism for turning such a flap which can be incorporated in the interior of the wing—e. g., along the joining edges of the wing and flap.

A further object is to arrange the hinging and operating means for the flap so that the latter will be free from torsional deflection along its length without relying on its own torsional stiffness.

A still further object is to provide the adjacent edges of the wing and the flap with a number of coacting pairs of brackets having eyes to receive coaxial hinge pins, the hinge pins having at least one set of two mutually inclined splines on them, one of the splines being slidingly received in a slot provided in a wing bracket and the other being slidingly received in a slot provided in a flap bracket.

For an understanding of these and other objects and advantages of the invention, attention should be directed to the following description in which reference is made to the accompanying drawings.

In the drawings:

Figure 1 is a diagrammatic plan of a single jack aligned with and controlling a number of hinge pins arranged according to the invention;

Figures 2 and 3 are sectional elevations of one of the hinge pins and its associated coacting pair of brackets at the edge of the wing and an adjacent flap, respectively, the sections being taken respectively on the lines 2—2 and 3—3 of Figure 4;

Figure 4 is a developed view mainly of the splines of the hinge pin when the flap is in one extreme position;

Figure 5 is a sectional view, to a slightly smaller scale, showing in full lines the flap when lowered to an extreme position, the other extreme position of the flap being indicated by chain lines; and Figure 6 is a perspective view of the construction shown by Figure 5.

It may here be remarked that the construction of Figures 5 and 6 is a preferred construction, and differs slightly from that of Figures 2 to 4 as will be hereinafter pointed out; but in general the two constructions are substantially identical.

The flap 11 is shown in the drawings (see Figure 5 particularly) as a nose flap secured along the leading edge of an aircraft wing 12, though obviously the invention is equally applicable to a flap to be secured along the trailing edge of an aircraft wing. It is supported by a plurality of coacting pairs 14 of brackets, of which two pairs are seen in Figure 1.

Each wing bracket 16 comprises a pair of forwardly-extending arms 17 (Figure 6) with aligned eyes in them, the arms being spaced from one another axially to receive the associated bracket 18 of the flap. The eyes of all the brackets are coaxial.

It will be understood that any desired number of coacting pairs of brackets 14 may be axially disposed along the edge of the wing. The brackets will normally decrease in size along the edge of the wing towards the wing tip dependently upon the wing thickness at any given spanwise length, the brackets being of a size not to exceed the wing chord where they are secured to the edges of the wing and flap. The wing bracket 16 is recessed at 19 to receive the surfaces of the wing, as shown by Figure 5, and recesses 19a are provided in the flap bracket 18 to receive the surfaces of the flap.

Referring now to Figures 2 to 4 particularly, each hinge pin 20, carried in the eyes of a coacting pair of brackets, has a pair of diametrically-opposite straight splines 21 engaging in corresponding slots provided in the two arms of the wing bracket 16, and elsewhere a pair of diametrically-opposite inclined splines 22 engaged in slots provided in the flap bracket. Obviously, the necessary angular clearance will be provided for the inclined splines in the wing bracket, as indicated at 24, and for the straight splines in the flap bracket, as indicated at 25.

The main difference between the two constructions shown is that the extent of the angular clearance is used in Figures 2 to 4 to provide stops 27 to limit the turning movement of the flap, when the hinge pin of Figure 4 has been moved to the right, i. e., in the direction of the arrows 28. In Figures 5 and 6, however, use is made of a stop arm 30 on the flap bracket coacting in its extreme positions with abutments 31, 32. This construction is in general to be preferred to that of Figures 2 to 4 in which the straight and inclined splines are wedged into one of the brackets, as in that case some backlash may still be present between the splines and the other bracket. This possible disadvantage is entirely obviated by the use of the stop arm 30 and the associated abutments in the construction of Figures 5 and 6.

It is suggested that the inclination of the mutually-inclined splines 21, 22 should be such as to allow for a 30° turning movement of the flap for a three inch travel of the hinge pin. (Obviously, in the case of hinge pins of different diameters, the helix angles of the inclined splines 22 will be different.) In such a case the mechanism will be irreversible—i. e., the flap can be actuated only by axial movements of the hinge pins and not be pressure on its surface.

In consequence, a simple hydraulic jack can be used without increasing the risk of flutter. Figure 1 indicates diagrammatically such a jack at 34 with its plunger 35 shown in the mid-position, in which the flap would occupy a position midway between that shown by the full lines in Figure 5 and that indicated by the chain lines in that figure.

In practice it is preferred that all the hinge pins 20 should be joined to one another and be operated by means of a single applying means, such as the jack 34, which, as shown by Figure 1, can easily be accommodated in the interior of the wing along the line of the hinge pins. Thus, the hinge pins can be constituted by a common rod which would conveniently be of reduced section between each actual hinge pin, i. e., between each pair 14 of coacting brackets. The drawings, however, show the actual hinge pins as being hollow ones secured upon shafts 37 which are adapted at their ends 38 to be jointed to one another. In this way excessive friction on the hinges, such as might arise from bending of a common rod when the wing flexes under load, can be avoided.

By means of the invention the hinging of the flap and the actuating means therefor are entirely within the surface of the wing and flap. The hinge moment is applied at the maximum leverage allowable within the depth of the surface.

As the hinge pins are connected together so that the angular movement of each section of the flap relative to its adjacent portion of wing is the same, the flap is (substantially) free from torsional deflection along the length without reliance on its own torsional stiffness, which is limited in the case of a very thin flap.

What we claim as our invention and desire to secure by Letters Patent of the United States is:

1. For an aircraft wing having a flap hinged along one edge, hinging means including a number of coacting pairs of brackets which are secured along the adjacent edges of the wing and flap and which have coaxial eyes, each coacting pair of brackets having a hinge pin carried in its eyes and provided with at least two splines which are mutually inclined to one another, one of said splines being slidingly received in a slot provided in the wing bracket and the other of said splines being slidingly received in a slot provided in the flap bracket, and means for simultaneously moving the hinge pins axially to turn the flap.

2. For an aircraft wing having a flap hinged along one edge, hinging means including a number of coacting pairs of brackets which are secured along the adjacent edges of the wing and flap and which are of a size in a chord-wise direction not to exceed the chord of the wing where they are secured, the brackets having coaxial eyes and each coacting pair having a hinge pin carried in its eyes and provided with at least two splines which are mutually inclined to one another dependently upon the diameter of the hinge pin, one of said splines being slidingly received in a slot provided in the wing bracket and having angular clearance in the flap bracket, and the other of said splines being slidingly received in a slot provided in the flap bracket and having angular clearance in the wing bracket, and means for simultaneously moving the hinge pins axially to turn the flap.

3. For an aircraft wing having a flap hinged along one edge, hinging means including a number of coacting pairs of brackets which are secured along the adjacent edges of the wing and flap and which are of a size in a chord-wise direction not to exceed the chord of the wing where they are secured, each coacting pair of brackets comprising one bracket extending between arms of the other bracket, a hinge pin carried in eyes in said brackets and provided with at least two splines of which one is axial and the other is helical, one of said splines being slidingly received in a slot provided in the wing bracket and the other of said splines being slidingly received in a slot provided in the flap bracket, and means within the leading edge of the wing for simultaneously moving the hinge pins axially to turn the flap.

4. For an aircraft wing having a flap hinged along one edge, hinging means including a number of coacting pairs of brackets which are secured along the adjacent edges of the wing and flap and which are of a size in a chord-wise direction not to exceed the chord of the wing where they are secured, the brackets having coaxial eyes and each coacting pair having a hinge pin carried in its eyes and provided with two pairs of diametrically-opposite splines, the splines of one pair being mutually inclined to the splines of the other pair dependently upon the diameter of the hinge pin, one pair of splines being slidingly received in a pair of diametrically-opposite slots provided in the wing bracket and having angular clearance in the flap bracket, and the pair of splines being slidingly received in a pair of diametrically-opposite slots provided in the flap bracket and having angular clearance in the wing bracket, means jointing said hinge pins to one another, and a single means at one end of the line of hinge pins for simultaneously moving the hinge pins axially to turn the flap.

References Cited in the file of this patent

UNITED STATES PATENTS

| | | |
|---|---|---|
| 2,252,251 | Cooper | Aug. 12, 1941 |
| 2,254,304 | Miller | Sept. 2, 1941 |